UNITED STATES PATENT OFFICE.

ALFRED E. FEROE, OF TIVOLI, NEW YORK, ASSIGNOR TO EDWARD C. POTTS, OF SAME PLACE.

PROCESS OF SEPARATING THE INSOLUBLE FROM THE SOLUBLE MATTER IN CORN AND MALT MASHES.

SPECIFICATION forming part of Letters Patent No. 303,141, dated August 5, 1884.

Application filed October 13, 1883. Renewed July 17, 1884. (No specimens.)

*To all whom it may concern:*

Be it known that I, ALFRED E. FEROE, a resident of Tivoli, in the county of Dutchess and State of New York, have invented an Improved Process for Separating the Insoluble from the Soluble Matter in Corn and Malt Mashes, of which the following is a full, clear, and exact description.

Heretofore the soluble matter in malt and corn mashes has usually been separated from the insoluble constituents by filtration under pressure, or by the slow method of draining through a perforated false bottom or sieve. This had to be done before boiling, and necessitated a second filtration after boiling, to remove the coagulated matter.

The object of this invention is to remove at one operation all the cellulose, coagulated albumen, and glutinous matter which exist in the mash at the time conversion is completed, and also that which is coagulated by the boiling. By my process I avoid the expense of filtering under pressure and the delays and difficulties of draining through a perforated false bottom, and render the use of two operations unnecessary.

My process is as follows: When the conversion is finished, the whole corn and malt mash is to be boiled until coagulation is complete. About one hour before the boiling is finished, I add to the boiling mash, in the proportion of about one ounce for each barrel, Irish moss or other gelatinous substance. After boiling, the mash is to be cooled to a moderate fermenting temperature—say from 60° to 70° Fahrenheit. I then add to it a sufficient quantity of yeast to produce a moderately-slow fermentation. At this stage the gelatinous substance becomes useful, because it is capable of retarding the carbonic-acid gas, which the insoluble matter alone is not, and of enveloping the insoluble matter. Consequently, when the gas generated by fermentation begins to rise, it carries with it the gelatinous and the insoluble matters to the surface, where they can be skimmed off, or the clear extract can be run off from under it. In other words, by the addition of the gelatine to the mash before fermentation, I provide the impurities, which otherwise would remain at the bottom or near it, with what might be termed "mechanical floats," by which they are caused to rise, and these impurities, together with the gelatine, which, in combination with the carbonic acid gas, causes them to ascend, are then removed by skimming or by the drawing off of the pure extract from below, as may be desired. When it is desirable to separate the insoluble matter of the mash from the extract before boiling, the Irish moss or other gelatinous substance should be separately prepared and added to the mash, and thoroughly stirred before fermentation commences.

Of course this invention has not reference to the separation from mash made of cornmeal and malt of the coarser parts of the meal and malt, but has reference only to treatment of such mash from which the coarser impurities have already been eliminated before the mashing process begins.

I claim—

1. The process herein described of separating the cellulose and other insoluble impurities from malt and corn mash, which process consists in adding to the mash, before fermentation, gelatinous substance, substantially as and for the purpose described.

2. The process herein described of treating malt and corn mash, which consists in adding gelatinous matter to the boiling mash, and then cooling the mash, and then adding yeast to cause fermentation, substantially as specified.

ALFRED E. FEROE.

Witnesses:
WILLY G. E. SCHULTZ,
HARRY SMITH.